July 27, 1954 — A. W. RAFFERTY — 2,684,779
SELF-SEALING CLOSURE FITTING
Filed May 22, 1950
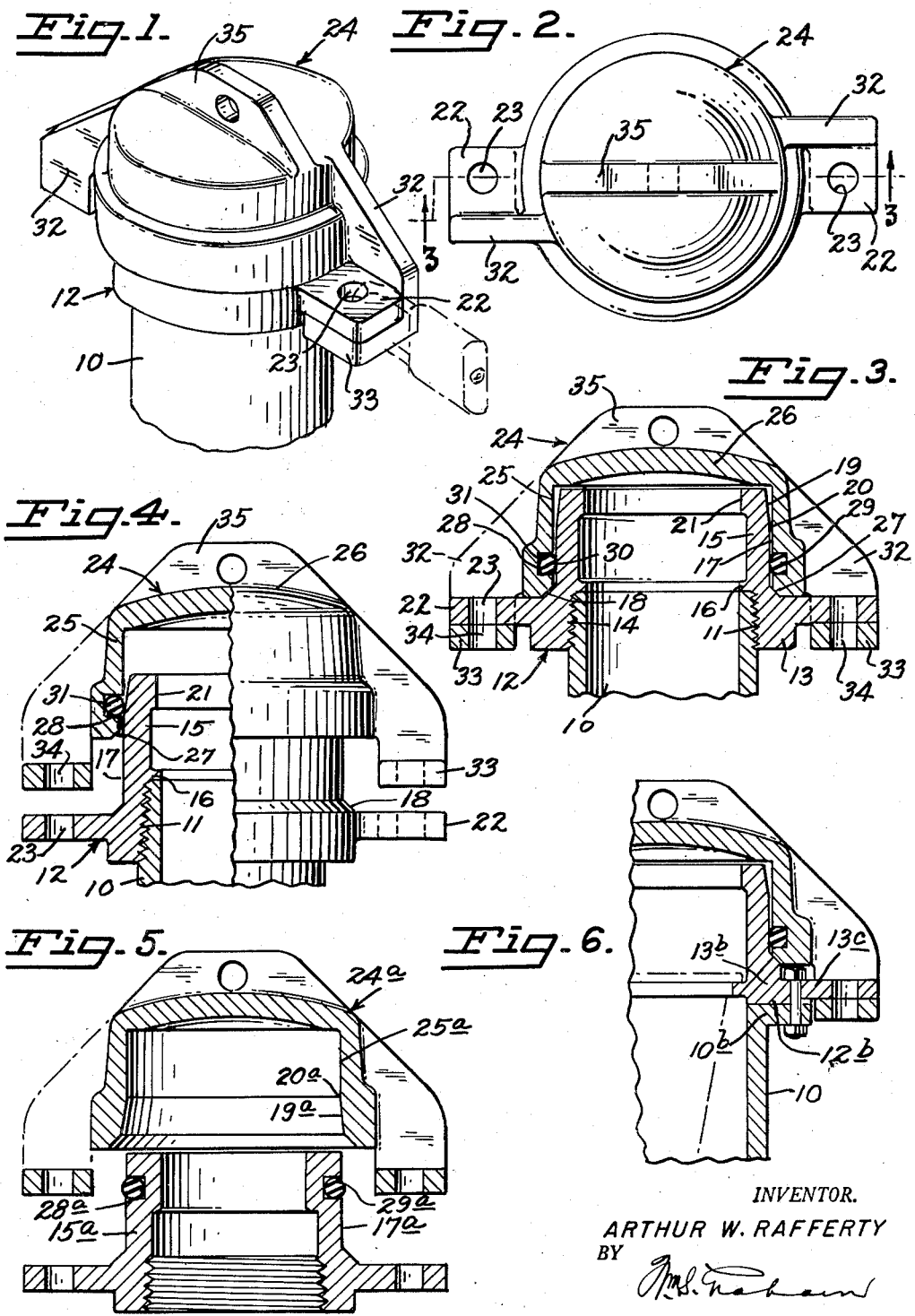
INVENTOR.
ARTHUR W. RAFFERTY
BY
ATTORNEY Patented July 27, 1954

2,684,779

UNITED STATES PATENT OFFICE 2,684,779

SELF-SEALING CLOSURE FITTING

Arthur W. Rafferty, Sacramento, Calif.

Application May 22, 1950, Serial No. 163,505

3 Claims. (Cl. 220—40)

1

This invention relates to self-sealing closure fitting in which a closure cap is also self-centering when placed upon an inlet or outlet opening which is to be closed thereby. The invention more particularly relates to such a closure fitting in which a closure cap has a slide-fit upon a cylindrical neck and is sealed by a gasket, and which may be mounted and demounted without use of tools. Optionally, there may be included, in appropriate instances, means for locking the positioned closure cap.

The purpose of the invention is to provide a simple, inexpensive, easily manipulated, self-sealing and self-centering closure fitting for cylindrical inlet or outlet vents of a great variety of liquid-containing vessels such as storage tanks which may be located above or under ground, or for other suitable outlets of tanks or conduits containing various characters of fluid products under gravity, vacuum or pressure.

A means is provided whereby, without tools, the closure cap may be installed or removed by manual operation only, obtaining a self-centering seat and a perfect seal against the escape of products contained within the vessel or conduit so fitted, or, in the case of underground tanks, the ingress or drainage thereinto of water or other undesirable matter.

Manifestly closure fittings are not broadly new, the most commonly used being the threaded connection type and the hinged type sealing by pressure against a packing gasket. In the threaded type the threads wear and become damaged and they require both time and effort to mount and demount the closure effectively. The known pressure type of closure usually makes its seal effective by flat packing gaskets of various types, which deteriorate, become lost or damaged.

Instances of advantageous use of the invention are very numerous, and broadly the invention will find advantageous use in any environment where it is desirable to seat a closure cap at the opening of a cylindrical member, and particularly where the fitting at such opening is subject to rough usage, or is exposed to possibility of entry of foreign matter such as water or dirt. As will be evidenced from the further description and the modified forms exemplified herein, the invention may be employed in new installations or may be adapted to previously installed installations.

The invention comprises an outlet member having a cylindrical neck portion and a cap to close circumferentially thereover, the outer diameter of the outlet member and the inner-diameter of the cap having between them a loose slide fit, a

2 first one of said members having at its free or open end a taper to its wall whereby the inner diameter at the open end of the closure cap is greater than the outer diameter of the opening of the outlet member at its free terminal end, and the second of said members having an inwardly open annular groove in which the center of the groove opening is spaced axially from the terminal open end of the second member substantially the distance of the axial length of the taper of the first member, the groove having therein a radially compressible sealing gasket which presents a relatively narrow sealing edge. Ancillary to the sealing of the outlet there is provided a locking means for the closure cap conveniently operative by seating and rotating the cap.

As illustrative of various advantageous uses of the invention, there are illustrated and described herein several forms in which the invention may be embodied, it being understood that changes of details may be resorted to without departing from the invention which is defined in the appended claims.

In the drawing:

Fig. 1 is a perspective view of the assembled parts of the invention.

Fig. 2 is a top plan view of Fig. 1.

Fig. 3 is a vertical transverse central section on line 3—3 of Fig. 2 with closure cap fully seated.

Fig. 4 is an initially closed view of Fig. 3, a portion being shown as side elevations and a portion in vertical transverse section.

Fig. 5 is a vertical transverse section of a modified form of the invention.

Fig. 6 is a fragmentary vertical transverse section of another modified form of the invention.

Referring to the accompanying drawing in which like reference characters indicate similar parts in respective views of corresponding forms of the invention, and referring firstly to the form of the invention illustrated in Figs. 1 to 4, a cylindrical fluid conduit outlet member of any fluid container is indicated 10, and for purposes of exemplification, said conduit outlet may be the fill stem or intake pipe of an underground storage tank for gasoline at a filling service station. As usual, it is provided at its outlet end portion with suitable threads 11 which heretofore have been the means for mounting a disc closure cap correspondingly internally threaded.

Mounted on the fill stem is a tubular adapter stub or spigot member generally indicated 12 comprising an annular ring base 13 internally threaded at 14 to engage the threads 11 of the fill stem. The adapter has an integral axially extended tubular neck 15 which extends from the base ring 13, the internal diameter of which is substantially similar to the internal diameter of the fill stem. An internal annular bead 16 may be provided in the neck to seat on the end of the fill stem, and also to serve as a support for a rim of a strainer, in the event that it is desired to employ a strainer in the fitting, as shown in broken lines in Fig. 6.

The external circumferential face 17 of the neck of the spigot adapter stub is smooth and it is preferably substantially prefectly cylindrical from the base for the major portion of its axial length, though immediately at its juncture with the base it is provided with a sharply inclined circumferential outward bevel 18 of approximately 45 degress to the axis. The exterior of the neck at its free interengageable open terminal end portion has a conical taper 19 inwardly towards its axis. As illustrated in its preferred form herein, the cylindrical portion of the neck is substantially longer than the tapered portion 19. The taper provides an angular sloping shoulder 20 at the juncture of the taper and the cylindrical portion 17. A taper of one to two degress is sufficient, but the angle of the taper has been somewhat exaggerated in the drawings for illustrative purposes. It is to be observed that this conical taper extends longitudinally along the outer wall of the cylindrical neck at the open end portion of the spigot stub adopter whereby the outer diameter of the neck is decreased progressively at said open end portion of the neck, the maximum of the taper being toward said open end and the minimum of the taper being at its opposite end at the shoulder 20.

At is free terminal open end the neck preferably has its wall thickened to provide a radially inwardly formed rim 21 the purpose of which is to provide a wide rim at the terminal opening of the neck where the neck of the stub receives its roughtest treatment in use, particularly since the wall at the terminal end would otherwise be relatively thin due to the maximum effect of the taper at the terminal end.

The base ring 13 is preferably provided with a plurality of circumferentially spaced locking lugs 22, two being shown relatively oppositely disposed, said lugs extending radially outwardly perpendicular to the base preferably at the upper portion of the base ring, so that they are spaced from the lower face thereof to cooperate with locking flanges on a closure cap to be described. These lugs 22 may be provided with holes 23 for receiving a lock bar.

A closure cap generally indicated 24 is provided to fit over and circumferentially enclose the neck and close the open terminal end of the spigot stub. The closure cap of Figs. 1 to 4 is an inverted cup, having an inner cylindrical side wall 25 substantially perfectly cylindrical so that the neck of the spigot stub may be slidingly interengaged therein, the closure cap having its top 26 preferably crowned. The bottom inner circumferential edge at the open end of the closure cap is chamfered as at 27 to seat on the bevel 18 of the spigot stub adapter. The internal axial dimension of the closure cap is preferably substantially the height of the neck 15, and its inner diameter is just sufficiently greater than the outer diameter of the cylindrical portion of the adapter neck 15 to rovide a loose slide fit therebetween.

Adjacently spaced from the open end of the closure cap, the inner cylindrical side wall 25 of the cap has recessed therein an annular inwardly opening groove 28 preferably rectangular in vertical section, the longitudinal center of the opening of the groove being preferably spaced from the open end of the cap substantially similar to the axial length of the taper 19. Within this groove is snugly and removably mounted a sealing ring gasket 29 which is of resilient body material, such as rubber composition or some of the more recently developed resiliently plastic compositions, no invention being claimed herein in the particular composition of the gasket since suitable sealing gaskets for the purpose are purchasable in the commercial market which have the desired resilience of body.

The gasket 29 is of greater cross-sectional dimension perpendicular to its axis than the depth of the groove 28, whereby the sealing face 30 of the gasket extends sufficiently beyond the plane of the groove opening to resiliently contact the outer diameter of the wall of the neck 15 of the adapter. In repose, and not under tension, the inner diameter of the sealing gasket is slightly or about $\frac{1}{16}$ inch less than the outer diameter of the neck at the minimum of the taper, just a trifle above the angle at the tapered shoulder 20, and is therefore greater than the outer diameter of the neck at the maximum of the taper 19 at the opening of the neck. The outer diameter of the gasket is substantially similar to the diameter of the bottom 31 of the groove 29. Preferably the gasket 29 is of the type commercially known as an O-ring, circular in plan and substantially circular in axial transverse cross section through its body, since such a gasket in a rectangular groove provides a narrow sealing face 30 for contacting the cylindrical wall of the adapter neck whereby friction is reduced to a minimum in mounting or rotating the closure cap. The circular cross section of the gasket also provides voids in the corners of the groove 29 to allow for displacement of the resilient gasket body when the gasket has pressure exerted thereon responsive to seating the closure cap on the adapter neck. Gaskets of other transverse cross sectional area of body may be employed, such as eliptical or triangular cross section, since either of these latter types would provide a relatively narrow sealing edge contacting the wall of the neck.

Locking means are provided between the closure cap and the adapter stub including a plurality of radially extended wings 32 as herein exemplified, two of such wings being shown, one at each opposite side of the cap, each having at its free end a retroverted substantially perpendicularly turned flange 33, the flanges being turned in opposite directions relatively, and the wings depending downwardly sufficiently below the lower face of the cap so that when the cap is fully seated said flanges may, upon suitable rotation of the cap, engage under the lugs 22 of the spigot stub. The flanges preferably have holes 34 to register with holes 23 of the lugs to receive any suitable lock bar.

If desired, the crown of the closure cap may also be provided with an upstanding transverse wing 35 to facilitate manual manipulation in the seating or removal of the cap.

In the modification of Fig. 5 the outer circumferential wall 17a of the adapter neck 15a is substantially perfectly cylindrical throughout its axial height, having outwardly opening groove 28a adjacently spaced from its free open end, the gasket 29a seating therein and extending from the groove opening similarly as previously described. In this modification the closure cap 24a may be characterized externally the same as the closure cap of Figs. 1 to 4, including the locking means. For the major portion, or substantially two-thirds of its axial length, adjacent its top, the inner circumferential wall 25a of the cap is cylindrical and of a slightly greater diameter than the outer diameter of the neck, sufficiently to provide a loose slide fit about the neck, the remaining length thereof, or approximately the one-third of said inner wall adjacent the open free end of the cap having a relatively long conical taper 19a radially outwardly and toward said free open end, whereby the inner diameter of the open end portion 19a of the closure cap is increased progressively in the direction of the open end by the inclined wall of the conical taper, thus providing a maximum of taper at the open end of the cap and a minimum of taper at the inner end of the taper at the shoulder 20a.

In the modification of Fig. 6 the adapter is arranged for attachment to a flanged outlet of a fill stem or header which are commonly closed by a disc plate bolted thereto by a plurality of circumferentially spaced edge bolts. In this modification the parts are substantially similar in operation to the parts of Figs. 1 to 4, the modification being at the base of the adapter 12b which has its base ring 13b provided with a radially extended flange 13c preferably around its entire circumference. The flange is adapted to overlie and seat on a corresponding flange 10b on the outlet of a pipe or header, the flanges of the pipe and adapter having corresponding perforations therethrough for bolting them together with a suitable washer therebetween. In other elements this modification may be substantially identical with Figs. 1 to 4.

The operation of the several examples of the invention are essentially substantially similar, though it will be manifest that in the modification of Fig. 5 the placing of the gasket in the neck and the taper in the cap will reverse the manner of operation of those parts, as compared with Figs. 1 to 4, and Fig. 6. Describing the operation in respect of Figs. 1 to 4, the closure cap is dropped upon the open interengaging outlet end of the neck of the adapter stub. By reason of the maximum of taper 19 the free open end of the neck is readily received within the open end of the closure cap and passes through the untensioned sealing gasket without necessity for exact axial alignment as would be necessary with threadedly connected parts. Since the fitting is made for situations of rough usage, the parts are relatively rugged and heavy, and the weight of the closure cap seats the gasket 29 upon the taper 19 immediately above the shoulder indicated 20, since the gasket is in repose. The taper also centers the cap relative to the adapter neck. Since the angular shoulder 20 of the bevel is of slightly greater diameter than the internal diameter of the gasket in repose, the initial seal at that point is substantially impervious against entry of water or foreign matter, provided there is no pressure of liquid from within the pipe or filler stem and provided that the cap is permitted to rest at that position without jarring or disturbing its coaxial alignment with the adapter. Therefore, regardless of how careless an operator may be about completely seating the cap, there is an initial automatic self-centering and self-sealing merely by dropping the cap upon the neck, sealing sufficiently to avoid the entry of water or other foreign matter or the danger of ignition of the fluid from exterior causes, if the fluid is inflammable.

At such initial position of seating, however, it is to be noted that the spacing of the gasket from the open end of the cap provides a cylindrical wall portion between the gasket and the open end of the cap. Such wall portion, at such initial seating position, is parallel and opposed to the cylindrical portion of the wall of the neck and thus serves as a guide for the further interengagement and seating of the closure cap.

A more securely impervious seal is accomplished by manually pressing downwardly upon the cap until it is completely seated and the chamfers 27, 18 are in contact. Since the outer diameter of the cylindrical portion of the neck is slightly greater than the internal diameter of the gasket, the sliding of the cap to a complete seat expands the diameter of the resilient gasket with a close sealing resilient contact against the cylindrical neck wall; and inasmuch as the inner sealing face of the gasket protrudes from the groove, the complete seating of the gasket forces the opposite outer diameter face of the gasket into tight sealing contact against the inset bottom wall of the groove, the relatively long cylindrical portion of neck 17 being guided to fit within the cylindrical portion 25 of the cap.

Obviously there is a degree of friction in sliding the sealing face of the gasket upon the cylindrical face of the neck against which it seals. But the narrowness of the contacting sealing face portion of the gasket reduces this friction to a minimum. This minimizing of the frictional contact of the gasket permits the closure cap to be readily rotated coaxial with the adapter neck and greatly reduces the frictional resistance in either seating or removing the cap, and it is also of especial significance for locking the cap against inadvertent removal or against any pressure of fluids or gases within a fluid line or a container, since in order to lock the cap on the neck it is only necessary to fully seat the closure cap with the wing flanges 33 in offset relation to the lugs 22, and then rotate the cap until the wing flanges underlie the lugs of the adapted whereby the cap is locked against any force urging the cap upward. If a lock bar of any kind is inserted through any one of the pairs of registering openings 23 and 34 of the corresponding relatively overlying lug and flange, the cap cannot be rotated to release the locking means.

Some of the difficulties eliminated by specific features of the invention may be briefly mentioned. A threadedly mounted cap takes time for centering exactly to interengage cooperating threads; a threaded closure is not securely sealed until cinched tight which takes time and is often carelessly and ineffectively performed, and if performed effectively it is difficult to loosen the cap; threads become worn and make loose imperfectly sealed closures; threads are delicately machined and pitched and easily become nicked, sometimes cross-threaded, so that a cap will not fit at all; if threads are damaged appreciably they have to be recut; if the damage occurs at the lead threads a closure cannot be started thereon.

With the present invention the operator consumes no appreciable time to seat the cap; the sealing by the cap is instantaneous merely by the initial dropping of the cap upon the neck; even though the cap be dropped offset from axial alignment, the bevel will align the cap coaxially; if the terminal end face of the neck becomes nicked or burred at its circumferential peripheral edge the burr of the nick will not prevent the cap from sealing because of the space allowance between cap and neck due to the taper of the neck at its open end portion; if the burr protrudes substantially it may be readily filed off against a smooth surface which is impossible with burred threads; due to the minimum of frictional contact by the gasket the cap may be completely seated merely by direct pressure, and for the same reason the cap may be manually rotated with no substantial resistance either when seated or removing it or in effectuating interengagement of the locking means; sand or other detritus which wear and damage threads are eliminated in this connection since the cylindrical sealing surfaces are wiped clean by the gasket.

Having described the invention what is claimed as new and patentable is:

1. A closure fitting for outlets of fluid conduits including a pair of interengageable coupling members comprising a tubular spigot adapter member adapted at one end for connection to a conduit and having at its opposite end portion an axially extended neck said neck being externally cylindrical throughout with the exception of the portion adjacent the free end thereof which is conically tapered axially inwardly toward said free end, a closure cap member having at least a portion of its internal wall cylindrical and having slidable fit on said neck, said cap member having an open end slidably interengageable with the free end of said neck, the closure cap member having an annular, rectangular shaped groove intermediate the ends of its cylindrical wall and more nearly adjacent to the open end than the opposite end of said wall, a resilient sealing gasket which is circular in cross-section mounted in said groove the width of said groove being such as to snugly receive said gasket and the depth of the groove being less than the diameter of the sealing gasket, the maximum of the taper of the neck being at the free end thereof whereby the open end of the closure cap is of greater diameter than the free end of the neck received therein, the outer diameter of the neck at the maximum of said taper being less than the inner diameter of the sealing gasket in repose whereby the maximum of the taper may freely pass through the gasket in repose, the diameter of the neck at the minimum of said taper being sufficient to engage said gasket in repose, and the diameter of the cylindrical wall portion of the neck member being sufficient to engage and compress the gasket into said groove in the closure cap, and means operable by rotation of the seated cap for locking the cap in closing relation on the neck.

2. A closure fitting for outlets of fluid conduits including the elements of claim 1 and in which the stub adapter has a circumferential bevel at the base of the neck and the closure cap has a chamfer at its open end for seating on said bevel of the stub adapter.

3. A closure fitting of the character described having the elements of claim 1 and in which the locking means includes a plurality of lugs radially extended from the stub adapter and the closure cap is provided with a plurality of circumferentially spaced depending radially extended wings, the free ends of the wings being flanged perpendicularly, the wings depending beyond the open end of the cap sufficiently for the flanges thereof to engage under the lugs of the stub adapter by rotation of the fully seated cap on the neck.

References Cited in the file of this patent

UNITED STATES PATENTS

| Number | Name | Date |
|---|---|---|
| 47,216 | Neuberger et al. | Apr. 11, 1865 |
| 1,357,311 | Buente | Nov. 2, 1920 |
| 1,656,318 | Costello | Jan. 17, 1928 |
| 1,715,328 | Joncha | May 28, 1929 |
| 1,870,118 | Holston | Aug. 2, 1932 |
| 1,976,589 | Trickey | Oct. 9, 1934 |
| 2,079,813 | Podel | May 11, 1937 |
| 2,117,407 | Davis | May 17, 1938 |
| 2,376,566 | Woodling | May 22, 1945 |
| 2,403,778 | Zdanaitis | July 9, 1946 |
| 2,436,407 | Stephens | Feb. 24, 1948 |
| 2,534,164 | Finch | Dec. 12, 1950 |

FOREIGN PATENTS

| Number | Country | Date |
|---|---|---|
| 302,991 | Great Britain | Feb. 28, 1929 |